(12) United States Patent
Harris

(10) Patent No.: US 7,587,344 B2
(45) Date of Patent: *Sep. 8, 2009

(54) SYSTEM AND METHOD FOR PROCESSING A PRODUCT PRICE OR QUOTATION REQUEST AND PLACING A PRODUCT ORDER VIA A COMMUNICATIONS NETWORK

(76) Inventor: William F. Harris, 4800 Kelly Woods La., Charlotte, NC (US) 28277

( * ) Notice: Subject to any disclaimer, the term of this patent is extended or adjusted under 35 U.S.C. 154(b) by 76 days.

This patent is subject to a terminal disclaimer.

(21) Appl. No.: 12/032,294

(22) Filed: Feb. 15, 2008

(65) Prior Publication Data

US 2008/0215458 A1   Sep. 4, 2008

Related U.S. Application Data

(63) Continuation of application No. 09/662,398, filed on Sep. 14, 2000, now Pat. No. 7,333,944.

(51) Int. Cl.
*G06Q 30/00* (2006.01)
(52) U.S. Cl. ....................................................... 705/26
(58) Field of Classification Search ................... 705/26, 705/27
See application file for complete search history.

(56) References Cited

U.S. PATENT DOCUMENTS

| | | | |
|---|---|---|---|
| 4,887,208 | A | 12/1989 | Schneider et al. |
| 4,972,318 | A | 11/1990 | Brown et al. |
| 5,842,178 | A | 11/1998 | Giovannoli |
| 5,913,210 | A | 6/1999 | Call |
| 5,960,411 | A | 9/1999 | Hartman et al. |
| 6,029,141 | A | 2/2000 | Bezos et al. |
| 6,064,979 | A | 5/2000 | Perkowski |

(Continued)

OTHER PUBLICATIONS

Eric Wieffering, *Middleman surviving challenge of Internet*, startribune.com, Metro Edition; Feb. 6, 2000; <http:/proquest.umi.com/pdgweb?did=49266932&Fmt=3&clientId=19649&RQT?309&VName=PQD>.

(Continued)

*Primary Examiner*—Jeffrey A Smith
*Assistant Examiner*—Amee A Shah
(74) *Attorney, Agent, or Firm*—Alston & Bird LLP

(57) ABSTRACT

A system and method for a manufacturer to attract a customer for a distributor, via a public access network, and perform product information and ordering transactions with the customer, where the order receives the financing approval of the distributor and an associated manufacturer's representative receives a commission. The system and method includes the customer submitting a price/quotation request or product order to a host system via the public access communications network. The host system interacts with the customer, the manufacturer and the distributor in order to fulfill the customer request. The host system retrieves a customer price for the product, where the customer price is based on a predetermined pricing function that varies depending on a customer or distributor identification. The host system may also generate an order for purchase, based on the customer's request, and transmit customer information associated with the order to the distributor for financial acceptance. Upon receiving a signal representing a financial acceptance, a commission is assigned to a manufacturer's representative associated with the order, where the commission is determined based on a predetermined commission function. The host system interacts with the customer, distributor and manufacturer to insure fulfillment of the order, including shipment of the order and settlement of payments.

22 Claims, 11 Drawing Sheets

U.S. PATENT DOCUMENTS

| | | |
|---|---|---|
| 6,263,317 B1 | 7/2001 | Sharp et al. |
| 6,594,641 B1 | 7/2003 | Southam |
| 6,618,706 B1 | 9/2003 | Rive et al. |
| 2002/0072984 A1 | 6/2002 | Rothman et al. |
| 2002/0099622 A1 | 7/2002 | Langhammer |

OTHER PUBLICATIONS

Internet Archive Wayback Machine, www.archive.org; www.dontforgettotakeyourvitamines.com; Dec. 6, 2003; 3 pgs.

SYSTEM AND METHOD FOR PROCESSING A PRODUCT PRICE OR QUOTATION REQUEST AND PLACING A PRODUCT ORDER VIA A COMMUNICATIONS NETWORK

CROSS-REFERENCE TO RELATED APPLICATION

This is a continuation of U.S. application Ser. No. 09/662,398, filed Sep. 14, 2000, now U.S. Pat. No. 7,333,944 the contents of which are incorporated herein in their entirety by reference.

BACKGROUND OF THE INVENTION

This invention relates to a computer system and method for processing product price requests and placing product orders, and more particularly, to a system and method for pricing and ordering products over the Internet.

In order to sell their products to customers, manufacturers typically employ a chain of manufacturer's representatives and distributors. The manufacturer's representatives make sales calls on the distributors to encourage them to carry the manufacturer's products. The distributors stock and sell the manufacturer's products and advertise these products. Further, the manufacturer's representatives make sales calls on customers, such as contractors who utilize the products and designers who specify the products, to encourage them to purchase or specify the manufacturer's products. For example, the customers of a lighting manufacturer's products, such as lighting fixtures, include: architects, engineers and designers who specify the lighting requirements for various projects; contractors; corporations; military buying services; retail consumers; and wholesalers and other similar accounts.

The customers have a number of options when desiring to purchase products. They may directly contact the distributor to purchase the products, or they may work with the manufacturer's representative. These contacts may be in person, over the phone, via facsimile documents, or over a communications network such as the electronic mail and World Wide Web protocols of the Internet. As "surfing" the Web becomes increasingly popular, increasing numbers of customers are becoming comfortable with inquiring about and ordering products over the Web. Businesses are aware of this trend, and as such a potential customer surfing the Web is exposed to dramatically expanding options in purchasing a product.

With the relative low cost of establishing a website and offering products for sale, many manufacturers are foregoing the traditional sales and distribution methods in favor of direct marketing on the Web. In many of these instances, the manufacturers replace the distributors and manufacturer's representatives with the direct marketing website. This creates a number of problems, however, as the manufacturer is then solely responsible for promoting and distributing it's own products. Further, when problems with a product arises in the field, the service traditionally provided by the manufacturer's representative is no longer available, leading to further problems for the manufacturer. Additionally, by dropping the distributors and manufacturer's representatives, the manufacturer losses a lot of contact points for promoting their product.

Realizing these disadvantages, some manufacturer's offer products both through the traditional chain of distributors and representatives, as well as directly on a website. The problem with this scenario, however, is that the distributors and representatives view the direct sales website as a competitor, and a threat to their own business. Thus, by implementing this structure, manufacturers are damaging the morale and cooperativeness of their own business associates.

BRIEF SUMMARY OF THE INVENTION

Thus, there is a particular need for a manufacturer to increase the level of promotion of their products while still retaining, integrating and providing incentives to distributors and manufacturer's representatives.

In accordance with one embodiment of the invention, a method for ordering a product includes receiving a request for an order via a communications network, where the order includes a product code identifying a product to be purchased and a customer identification identifying a customer. The method also includes retrieving a customer price for the product, where the customer price is based on a predetermined pricing function that is associated with the customer identification. Further, associated with the method is providing a commission to an agent associated with the order and with a manufacturer of the product, where the commission is determined based on a predetermined commission function.

In an alternate embodiment, a method for placing a purchase order includes receiving a request for an order via a communications network, where the order includes a product code identifying a product to be purchased and a customer identification identifying a customer. The method further includes retrieving a customer price for the product, where the customer price is based on a predetermined pricing function that is associated with the customer identification. Further, the method includes identifying a distributor of the product from a plurality of distributors based on the customer identification. The customer identification and customer price are transmitted to the identified distributor for financial approval. After receiving an acceptance notification from the identified distributor, then the product in the order is shipped to the customer.

In yet another alternate embodiment, a server system for generating an order for a product includes a receiver component that receives a request to order a product and that also receives financial authorizations. The request includes a product code that identifies the product and a customer identification that identifies a customer. The financial authorization includes an acknowledgment from a distributor verifying a customer account. The system further includes a data storage medium that stores information for a plurality of products, including a customer price associated with each of the plurality of products. The customer price is based on a predetermined pricing function that varies based on the customer identification. Additionally, the system includes an order placement component that retrieves from the data storage medium information for the identified product and that uses the retrieved information to place an order for the product from a manufacturer of the product. Further, the system includes an order fulfillment component that completes a purchase of the product in accordance with the order placed by the order placement component.

DETAILED DESCRIPTION OF THE INVENTION

Figure 1:
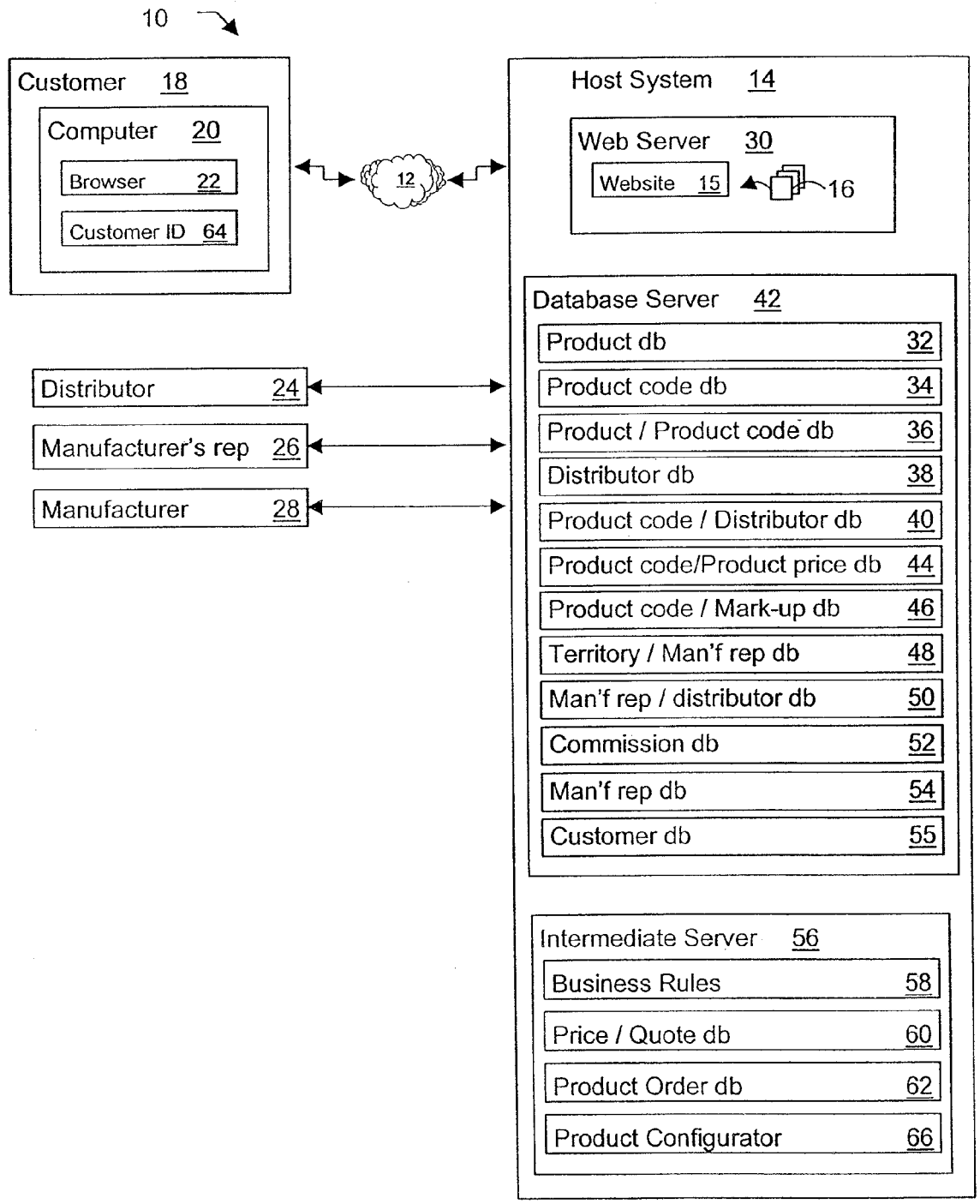
FIG. 1 is a schematic representation of one embodiment of a system for receiving a quotation and placing a product order via a communications network.
Figure 2:
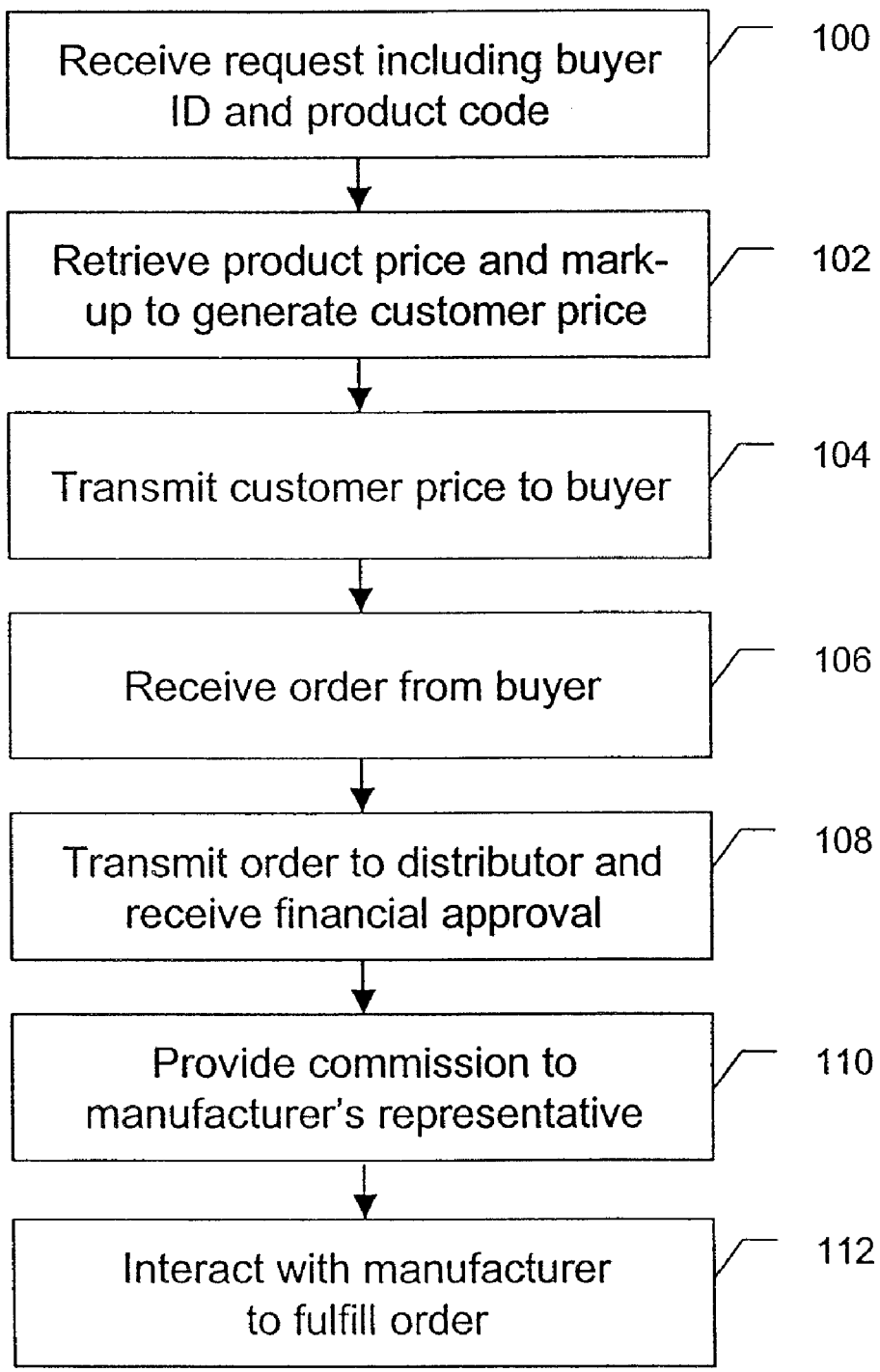
FIG. 2 is a flow chart of one embodiment of a method for receiving a quotation and placing a product order via a communications network.

Referring to FIGS. 1 and 2, one embodiment of a system 10 for processing requests for product pricing information and product orders via a communications network 12, while integrating the request with a traditional product distribution chain, includes a host system 14 that provides a website 15 promoting products for sale via interactive web pages 16. The host system 14 receives the request, including a customer identification and a selected product code, from a customer 18 interacting with the web pages 16 that are provided over the communications network 12, preferably a public access network such as the Internet, and displayed on a computer 20 using a browser 22 (Block 100, FIG. 2). The host system 14 retrieves a product price utilizing a predetermined pricing function based on the product code and a mark-up based on the customer identification. The product price and mark-up are combined into a customer price, which is transmitted to the customer 18 (Blocks 102 and 104). Further, the host system 14 interacts with a distributor 24 of the product, who is selected from a plurality of distributors through specific identification by the customer or through automatic identification by analyzing the data in the request. The distributor 24 acknowledges whether the customer 18 is a customer of the distributor, if so indicated by the request, in order for the host system 14 to determine the customer price. Additionally, if the customer 18 submits an order to purchase the product (Block 106), the host system 14 transmits the order to the distributor 24 for financial approval (Block 108) and to the manufacturer for notification purposes. Upon receiving an acceptance signal from the distributor 24 approving the financial aspects of the order (Block 108), the host system 14 notifies the manufacturer 28. The host system 14 and/or manufacturer 28, typically upon receiving a payment from the distributor 24 for the order, provides a commission based on a predetermined commission function to a manufacturer's representative 26 (Block 110). The manufacturer's representative 26, who is selected from a plurality of representatives, is associated with the order through the information in the order, such as the product and/or through a territory corresponding to the location of the customer 18. Further, the manufacturer's representative 26 is typically responsible for the sales and service of the product in the territory. Finally, the host system 14 may interact with a manufacturer 28 of the product, who fulfills the order and preferably delivers the product directly to the customer 18 (Block 112). Thus, the system and method provide a manufacturer-sponsored website for the direct pricing/ordering of products, with the distributor having financial approval of the customer order and with order-based commissions provided to a manufacturer's representative.

The website 15 of the host system 14, in one embodiment, primarily promotes the products associated with a single manufacturer 28. As such, the website 15 provides a co-marketing vehicle between the manufacturer and its associated distributors and representatives. The manufacturer-specific website 15 allows the manufacturer to independently promote their own products, as opposed to a distributor website that may include the manufacturer's products along with a competitor's products. By integrating this manufacturer-specific website with the traditional sales and distribution chain, the manufacturer gains an additional, focused marketing tool that rewards the traditional players in the sales and distribution chain while reducing the burden on these players. Pricing requests and product orders are handled primarily through the host system 14, requiring only customer account confirmation and product order financial approvals from the distributor, while rewarding the manufacturer's representative with a commission on the order. The system and method herein may provide relief to the distributor from having to carry inventory to fill the order and the associated inventory carrying costs, such as for taxes, insurance and security. Further, the system and method herein may relieve the distributor of most of the logistics associated with filling the order, as the manufacturer handles most of the shipment logistics. Further, by providing a commission to the manufacturer's representative, the manufacturer's representative experiences expanded sales in their territory without expending any cost or effort. The commission based on the sales provided by the system and method herein thereby give the manufacturer's representative an incentive to initiate or continue providing service to the customer. Thus, the present system and method provides the manufacturer with an additional marketing outlet, which the manufacturer can control, without alienating the traditional participants in the distribution chain, and thereby retaining the inherent benefits provided by these business associates or agents.

In the architecture of the system 10, the host system 14 includes one or more computer servers each having processors, data storage medium, receiving components and transmitting components for the processing, storing, input and output of data, signals and business rules for performing the customer price information and product order transactions.

For example, referring to FIG. 1, the host system 14 may include a web server 30 for storing and generating the web pages 16 and for parsing the data of the incoming request for use by the rest of the host system 14. In generating the web pages 16 and performing other associated tasks, the web server 30 accesses a variety of information.

The host system 14 may also include one or more database servers 42 including various databases and tables utilized in processing the transactions. For example, the web server 30 may interact with the database server 42 that includes a product database 32 storing of all the information about the products available from the manufacturer 28, a product code database 34 storing of all the identifiers of products, a product/product code database 36 associating the various products with their corresponding product code, a distributor database 38 storing all of the information about the distributors of the products, and a product or product code/distributor database 40 associating the product or product code with the one or more distributors that supply the product. Additionally, for example, the database server 42 may include: a product or product code/product price database 44 associating a price with each product; a product or product code/mark-up database 46 associating a predefined mark-up factor or amount to multiply by or add to the product price of each product; a territory/manufacturer's representative database 48 associating a given geographical territory with each manufacturer's representative; a manufacturer's representative/distributor and/or manufacturer database 50 associating a manufacturer's representative with a distributor with whom the representative is working; a commission database 52 storing information relating to calculating and crediting commission amounts to each manufacturer's representative and tables associating a commission rate or percentage or factor with the manufacturer's representative and the distributor and/or manufacturer; a manufacturer's representative database 54 storing of all the information about each of the manufacturer's representatives; and a customer database 55 storing all of the information about the customer, as well as customer preferences such as preferred distributors and the associated customer account numbers.

Further, the host system 14 may include an intermediate server 56 including business rules 58 for performing the various transactions, a price/quote database 60 storing information related to each request for price or request for quotation, and a product order database 62 storing information related to the content and fulfillment of the purchase orders. The intermediate server 56 may further include a product configurator 66, which is a software module that interacts with the customer and with the data within the host system 14 to assemble a product and product options into predefined product configurations for ordering purposes.

Although shown as three separate servers, the web server 30, database server 42 and intermediate server 56 may be combined into a single server. Additionally, although the host system 14 is described as having the data and processing capabilities for performing the methods of the present invention, the computer 20 of the customer 18 may share some of these tasks. Thus, the servers of the host system 14 include all of the software and the data and data relationships for the host system 14 to determine a customer price for a product based on the identified distributor, as well as determining a commission and a manufacturer's representative to credit based on an order.

As mentioned above, the system 10 is preferably sponsored by a single manufacturer 28, although it is possible that more than one manufacturer may join together in offering their products on the website 15. For example, manufacturers with complementary products may jointly promote the website 15 in order to offer a potential customer a more complete selection of products from which to choose. For example, a light fixture manufacturer promoting the website 15 may join together with one or more manufacturers of complementary products, such as lamps or ballast. Other arrangements of manufacturers joining together may also be utilized. The manufacturer 28 generally produces a selection of products that may be offered for sale directly by the manufacturer, or through a sales and distribution chain incorporating, for example, manufacturer's representatives 26 or other marketing/sales agents and distributors 24 or other resellers. For example, in the lighting industry, one example of a manufacturer is W.F. Harris Lighting of Monroe, N.C.

The customer 18 may be any potential product specifier, purchaser or anyone interested in a product produced by the manufacturer 28. For example, the customer 18 may be a designer who specifies products, a commercial customer or a retail customer. Customers who specify a product include, for example, designers, engineers and architects. A commercial customer is a customer who qualifies to purchase a product at a discount because they are a reseller of the product and/or because they purchase large quantities of the product. An example of commercial customer in the lighting industry, for example, includes contractors. In contrast, a retail customer is a consumer, generally without industry ties and generally making a one-time, small quantity purchase.

In the system 10, one or more customers 18 may interact with the host system 14 at any one time. The customer 18 provides an identity to the host system 14 using a customer identification 64. The customer identification 64 may be one or a combination of data such as: the customer's name; the customer's address or location, including one or more of the street name, city, state, zip code, county and country; an account number, where the account number includes the customer's customer account number with a distributor, or where the account number includes a financial account, such as a credit, debit, charge, savings or checking account, with a financial institution, or where the account number includes a contractor number or a specifying architect/engineer/designer number; an Internet protocol (IP) address, which may indirectly include the customer's location; a biometric identifier, such as based on a fingerprint, iris, eye, face, handwriting, and other similar biometrics; and any other unique alphabetic, numeric or alphanumeric code, such as a website-specific name and password that identifies the customer.

The distributor 24 is one of a plurality of entities that resell the product or products of the manufacturer 28. The distributor 24 also may promote the products of the manufacturer 28 to potential customers 18. Usually a manufacturer 28 is associated with a number of distributors 24 in order to increase the scope of marketing of their product. Typically, the distributor 24 keeps an inventory of the manufacturer's products and makes that inventory available to the customer 18 in a typical sales/distribution chain transaction, however, that inventory is not required or utilized by the present invention.

In a traditional sales/distribution chain transaction, for example, the distributor gives the customer a customer price for a product. The distributor-quoted customer price includes a product price plus a unique mark-up, where the product price may be the price the distributor paid for the product and the unique mark-up includes a distributor-specific additional amount the distributor charges for the product to cover their expenses and profit. If the customer wants the product, the customer submits an order to the distributor, and the distributor ships the product from inventory to the customer and bills the customer. The customer pays the distributor, while the distributor had previously paid the manufacturer for the product after receiving it into inventory. In this traditional scenario, the distributor incurs costs, such as taxes and overhead on the inventory of the product. Further, the distributor incurs cost in marketing and promoting the product, as well as in managing the order process and arranging the delivery and delivering the product, and further including the costs of carrying inventory.

The present system 10 and method allows the distributor 24 to avoid many of these costs on the incremental sales provided herein, however, as the host system 14 manages the majority of transactions involved in the request for pricing information and product orders from the customer 18. The distributor 24 is primarily involved in the aspect of approving customer's method of financing identified in the product order and settling the transaction, when the customer 18 purchases a product through the host system 14. For example, the distributor 24 validates a given customer account and insures a given customer credit limit is not exceeded by the order. Further, the distributor 24 interacts with the host system 14 to confirm whether or not the customer 18 has a customer account with the distributor, or otherwise qualifies for special pricing. Thus, the distributor avoids all of the inventory and product delivery costs while being able to make money by financing transactions with which the distributor is not directly involved.

The manufacturer's representative or agent 26 is one of a plurality of individuals or organizations associated with the manufacturer 28 that market and sell their products. A manufacturer's representative 26 may have an exclusive contract to represent the products of only one manufacturer, or they may be independent and represent a number of competing manufacturers. Additionally, there may be various manufacturer's representatives 26 in a given territory, such as a distributor representative, a showroom or commercial representative, etc. Further, the manufacturer's representative 26 typically has a contract with the manufacturer 28 that establishes a commission to be paid to the representative for generating orders/sales of the products. For example, the manufacturer's representative 26 may have a commission equal to a percentage of the sales price of the product, or equal to a flat rate for each sale, where the percentage or rate may vary depending on the distributor, manufacturer and/or product.

The system 10 for processing requests for product pricing information and product orders now will be further described with reference to lighting products. The system and methods of the present invention may be utilized with any other commercially- or retail-available products, however, where it is desirable for a manufacturer to establish additional marketing opportunities for its products while maintaining and integrating distributors and manufacturer's representatives or other business associates in a typical marketing/distributor chain.

Figure 3:
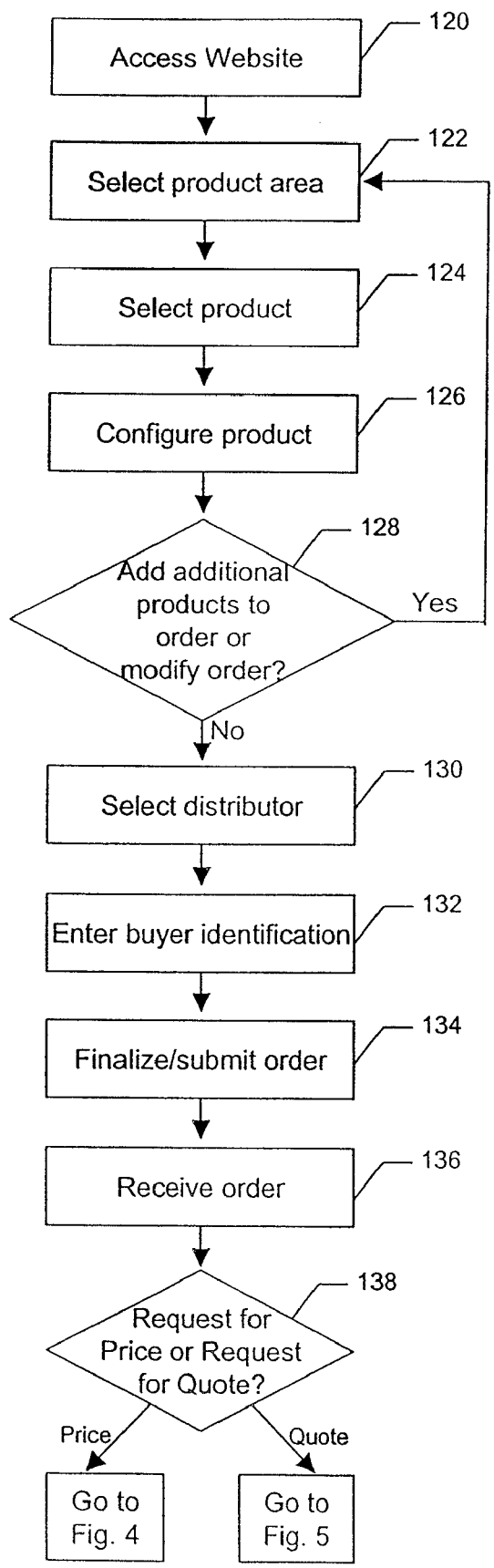
FIG. 3 is a flow chart of one embodiment of the initiation of a request for price or request for quotation process.

In one exemplary embodiment of a system and method for processing requests for product pricing information and product purchase orders, referring to FIGS. 1 and 3, a customer 18 accesses the web pages 16 of the website 15 generated by the host system 14 (Block 120). In order to have complete access to all of the functionality of the website 15, the customer 18 may need to enter a name and password to log in. For example, a commercial customer or other previous user may enter identification information to gain access to special ordering screens or to automatically recall previously-saved information. In contrast, a retail customer or a other first time visitor to the website 15 may be allowed to browse through predefined pages 16 and retrieve product information and pricing without requiring any identification information. Preferably, the website 15 promotes products of only the manufacturer 28, and includes information and data that fully describe the product to the customer 18 in order to answer questions the customer may have in making the pricing or purchasing decision. Further, the website 15 may be organized by product or by groups of products. The customer 18 may select a product area (Block 122) that displays a group of related products to narrow down their search for a particular product. Alternatively, the customer 18 may directly select a particular product within the website 15.

Once a desired product is found, then the customer selects the product (Block 124) and adds it to their request or order. For example, in viewing information on a product, the customer may select an order button displayed on the web page which automatically enters the product into an order. If the product selected by the customer 18 includes options and/or accessories, the host system 14 may prompt the customer to configure the product for example, by utilizing the product configurator 66 (Block 126). For example, the host system 14 may display web pages 16 to the customer showing the options and/or accessories, requiring the customer 18 to select a preferred option/accessory to complete the product selection. Once the product configuration is complete, the host system 14 may give the customer 18 the option to continue shopping so that additional products can be entered onto the order or so that the just-entered order can be modified, or to finalize and submit the order (Block 128). If the customer 18 indicates a preference to continue shopping, then the customer may select an area within the website 15, such as another product area, to continue shopping. If the customer 18 indicates the desire to finalize and submit the order, then the host system 14 may require the customer to select one from a plurality of distributors 24 (Block 130) and enter customer identification 64 (Block 132).

The selection of the distributor 24 (Block 130) may not be required, however, depending on information contained with the customer identification 64 or depending on whether the customer 18 is making a request for price or a request for quote, as are discussed below. For example, if the customer 18 is a previous visitor to the site and has stored a distributor preference on the host system 14 such as in the customer database 55, then the host system may retrieve this information automatically. Other information previously-stored on the host system 14 and associated with the customer 18 may include other preferences and information, such as the customer's customer account number associated with the indicated distributor and the customer's name and password for accessing the website. Further, for example, if the customer 18 is a retail customer and is only making a request for price, then the host system 14 may retrieve from the distributor database 38 the distributor that is geographically-located nearest to the customer based on the customer information 64. Alternatively, for example, if the customer 18 is a retail customer and is only making a request for price, then the host system 14 may not require a distributor association until a purchase order is entered, if a distributor is not automatically selected, and thus may merely retrieve a standard retail markup from the database server 42. Alternately, the system 10 may allow the customer 18 to enter multiple distributor identifications to enable the customer to efficiently make price comparisons.

Upon finalizing the order, the customer 18 submits it to the host system 14 (Block 134), indicating a request for price (RFP) or a request for quotation (RFQ). In a RFP transaction, the customer 18 is querying the host system 14 for a customer price for an identified product. Typically, the customer price will vary depending on the distributor and depending on whether or not the customer has an account with the distributor. The RFQ transaction may be utilized by a customer 18 to compare product pricing from various distributors prior to initiating an order. An RFQ is a special case transaction, where the customer believes a product price other than the usual customer price should be associated with an order. For example, a contractor ordering a large quantity or an unusual product configuration may utilize the RFQ transaction. The host system 14 receives the request and stores a copy in the price/quote database 60 (Block 136), and then determines if it is an RFP or an RFQ (Block 138).

Figure 4:
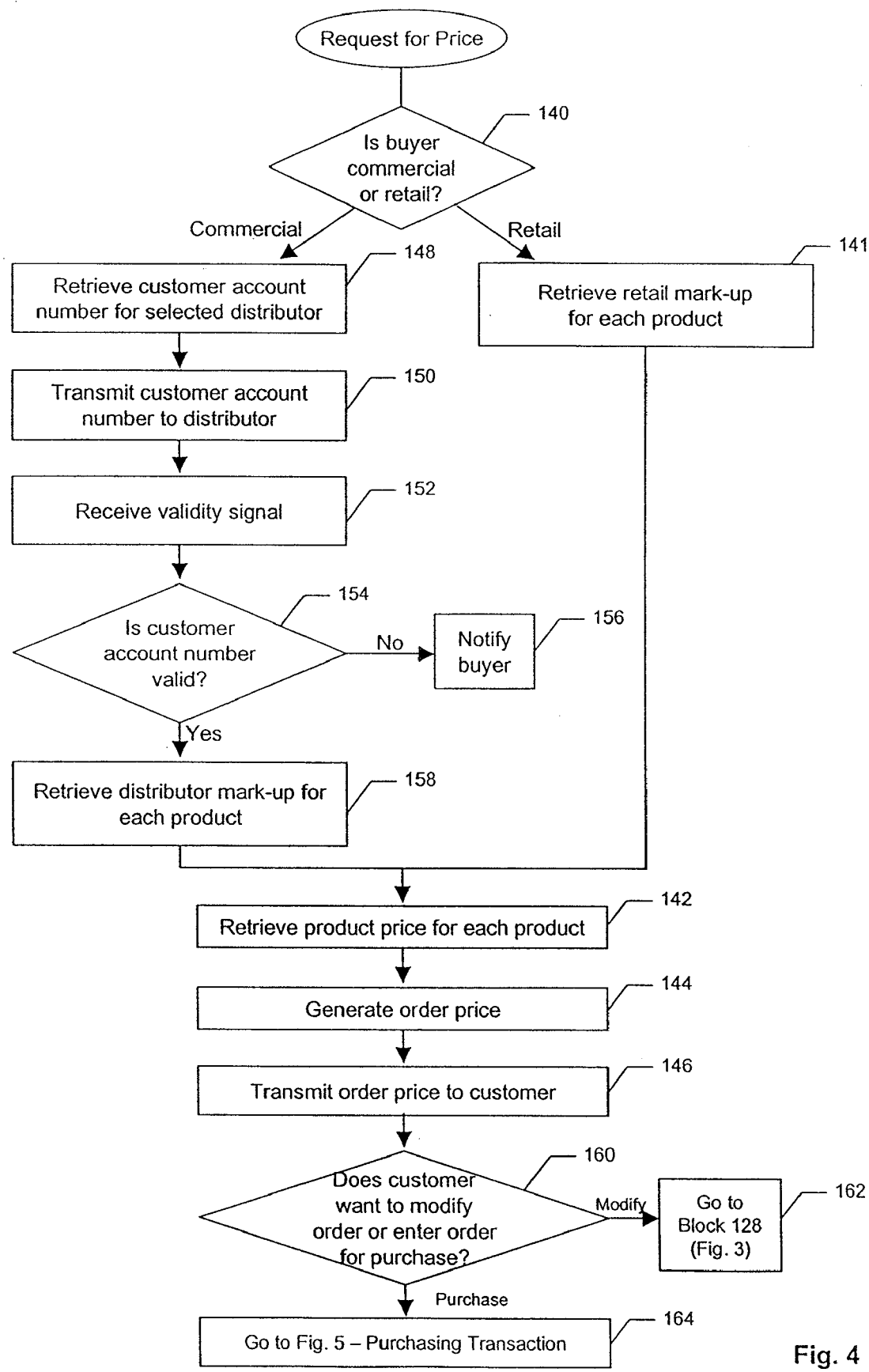
FIG. 4 is a flow chart further detailing one embodiment of the request for price process.

Referring to FIG. 4, if the request is an RFP, then the host system 14 determines if the customer 18 is a commercial customer or a retail customer based on the customer identification 64 (Block 140). Any number of methods or information within the customer identification 64 may be utilized to make this determination. For example, the host system 14 may identify the customer 18 as a commercial customer when the customer identification 64 includes a distributor identification and a customer account number for the identified distributor. Alternatively, for example, the host system 14 may identify the customer 18 as a retail customer when the customer identification includes a credit card account number or no account number at all.

If the customer 18 is identified as a retail customer, then the host system 14 retrieves a retail mark-up and a product price from the database server 42 and combines them into a customer price for each product in the order. (Blocks 141 and 142). The host system 14 then generates the order price (Block 144), which is the sum of the customer price times the product quantity for each product in the order, and transmits the order price to the customer 18 (Block 146).

Alternatively, if the customer 18 is identified as a commercial customer, then the host system 14 retrieves the customer account number for the distributor from the customer identification 64, or from the database server 42 if it has been previously stored (Block 148). The host system 14 then transmits the customer account number to the distributor for acknowledgment of the validity of the customer account number (Block 150). The host system 14 then receives a signal from the distributor indicating the validity of the customer account number (Block 152). The signal may also indicate that the customer is in good standing, i.e. has not exceeded their credit limit, with the distributor. The host system 14 then determines if the signal from the distributor indicates acceptance or rejection of the customer account number (Block 154). If the signal rejects the customer account number, then the host system 14 notifies the customer 18 (Block 156), who may be given one or more options such as to enter another customer account number, to modify the order to specify another distributor and customer account number, or to obtain a retail price. If the signal indicates acceptance of the customer account number, then the host system retrieves a distributor-specific mark-up and a product price from the database server 42, such as from the product code/mark-up database 46 and the product/product price database 44, for each product in the order (Blocks 158 and 142, respectively). The host system 14 then calculates the customer price and generates the order price (Block 144). The customer price is a function of the product price and distributor-specific mark-up. The order price is the sum of the customer price times the product quantity for each product in the order. The host system 14 then transmits the order price to the customer 18 (Block 146).

Along with the transmission of the order price (Block 146), the host system 14 may allow the customer 18 to indicate whether or not they would like to modify the order (Block 160). For example, the customer 18 may decide to alter the order quantity after seeing the order price, or the customer may decide to add or delete products from the order. If the host system 14 receives an indication for an order modification, then the host system returns the customer 18 to Block 128 to reconfigure and resubmit the order (Block 162). If the host system 14 receives an indication from the customer 18 to purchase the products identified in the order, then the host system stores a copy of the order in the product order database 62 and proceeds with a purchasing order transaction (Block 164 and FIG. 6).

Figure 5:
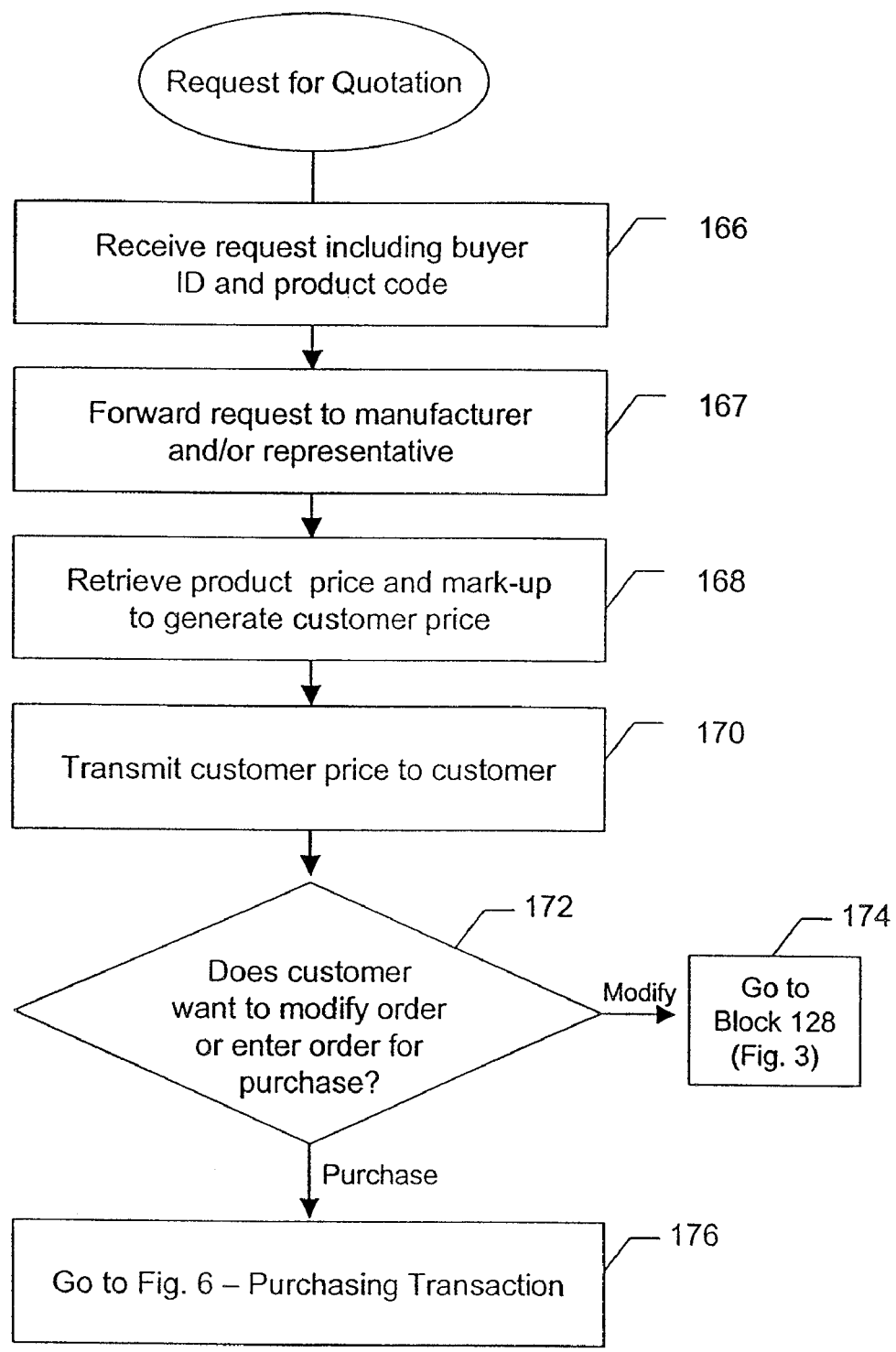
FIG. 5 is a flow chart further detailing one embodiment of the request for quotation process.

Referring to FIG. 5, if the received request is an RFQ (Block 166), then the host system 14 transmits the request to the manufacturer's representative 26 with notification to the manufacturer 18 (Block 167). Alternatively, the host system 14 may transmit the RFQ to the manufacturer 28, who then forwards the RFQ to the appropriate manufacturer's representative 26. In either case, the manufacturer 28 then evaluates the RFQ and provides a customer price for each product and forwards the RFQ to the manufacturer's representative 26 for approval. Alternately, the host system 14 may provide a suggested customer price based on predefined guidelines for a product price and a predefined mark-up, such as by varying the product price or predefined mark-up based on quantity, dollar amount of the order, the customer, etc (Block 168). The manufacturer's representative 26 reviews the RFQ to insure that the request does not conflict with other projects that the manufacturer's representative may already be working on with other customers. For example, a number of contractors may competitively bid for the same project, and if the manufacturer's representative 26 is already working with one contractor, the rep may not want to give a different price quote to the competing contractor, or the rep may not want to give any quote at all to the competing contractor. Once the rep 26 reviews the RFQ, a notice of a rejection or of an approval, with the quoted customer price, is returned to the customer 18 from the rep or through the manufacturer 28 or through the host system 14, with a copy being stored in the price/quote database 60 (Block 170, FIG. 1).

The quotation includes an order price, which is the sum of the customer price times the number of products for each product in the order. The customer price is a function of the product price and a quotation-specific mark-up for each product in the order. The quotation-specific mark-up may depend on the product price, a distributor-specific mark-up, the distributor, the product quantity, the product, the customer, the manufacturer's representative, and other similar variables that affect a customer price. As mentioned above, the quotation-specific mark-up may be predetermined and automatically selected by the host system 14 based on quantitive factors such as product quantity, product price, customer identification, etc.

The host system 14 then prompts the customer 18 about modifying the RFQ or placing an order for purchase (Block 172). If the host system 14 receives an indication from the customer 18 to modify the order, then the host system returns the customer to Block 128 (FIG. 3) to modify the order (Block 174). If the host system 14 receives purchase indication from the customer 18, then the host system stores a copy of the order in the product order database 62 (FIG. 1) and initiates a purchasing transaction (Block 176) (and see FIG. 6).

Figure 6:
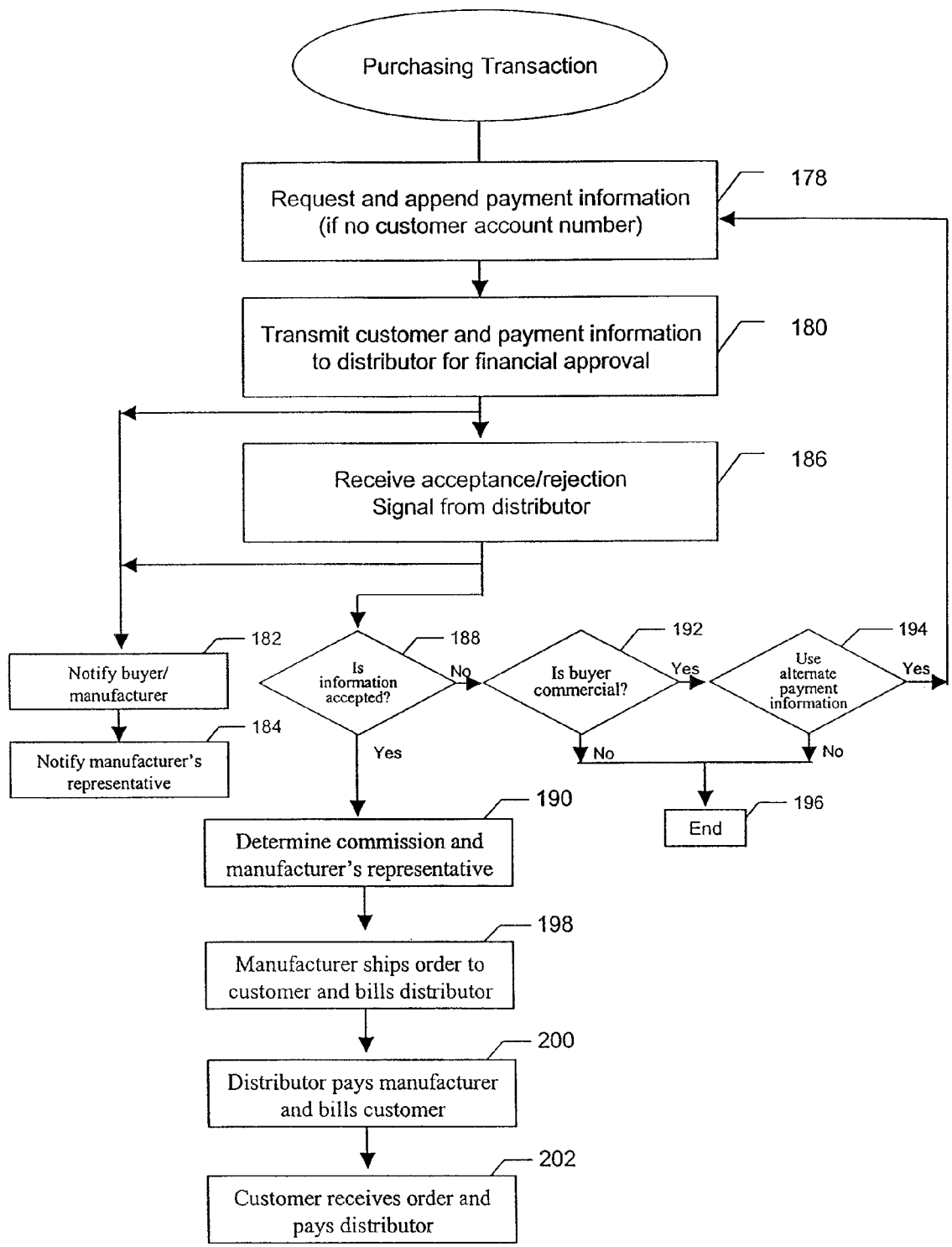
FIG. 6 is a flow chart detailing one embodiment of a product order transaction process.

Referring to FIG. 6, upon receiving a purchasing request for the order from the customer 18, and if payment information has not yet been provided or retrieved based on the customer identification 64, then the host system 14 requests and appends the payment information, such as a financial account number, to the order (Block 178). For example, this may occur when a retail customer desires to place a product order. The host system 14 updates the product order database 62 and then transmits all or a portion of the product order to the distributor 24 for financial approval (Block 180) and to the manufacturer for notification purposes (Block 182). For example, the distributor may receive the customer account number and the order price so that the transaction may be financially evaluated. The manufacturer 28, or alternatively the host system 14, then notifies the manufacturer's representative 26 (Block 184). The notifications, prior to approval, of the manufacturer 28 and rep 26 enable them to monitor the sales activity and approval process to ensure that an unscrupulous distributor does not supply a similar product to the customer, using a different manufacturer or representative, to satisfy the order outside the present system. The host system 14 then receives and stores a financial confirmation from the distributor, indicating that the customer account information is valid and optionally indicating that the customer's indicated method of payment is valid and accepted (Block 186). The host system 14 transmits and stores a notice of distributor acceptance or rejection to the manufacturer and customer (Block 182). The manufacturer 28, or alternatively the host system 14, then notifies the manufacturer's representative 26 (Block 184). Within the distributor acceptance signal, the distributor may include a purchase order number that the host system 14 forwards to the manufacturer. Alternatively, the distributor 24 may communicate a purchase order number to the manufacturer 28 via other methods, such as by fax, verbally or by electronic mail.

Further, upon determining that the customer and payment information is accepted (Block 188), the host system 14 may calculate and provide a commission to a manufacturer's representative 26 associated with the order (Block 190). In order to determine the proper manufacturer's representative 26, the host system 14 preferably utilizes the customer identification 64 to determine a location of the customer 18. The host system 14 associates the customer location with a territory, such as by using the customer's zip code, and associates the territory with a particular manufacturer's representative 26 using the information in the territory/manufacturer's representative database 48 (FIG. 1). Further, the host system 14 may determine and store the commission utilizing a predetermined commission function in the commission database 52. The commission is determined by a commission function that includes a commission percentage multiplied by the order price, where the commission percentage is based on the distributor and/or the manufacturer's representative and/or the manufacturer. Alternatively, the commission database 52 may store a commission rate that is associated with each product, or with the identified manufacturer's representative, and applied to each product in the order or to the whole order to determine the commission. The host system 14 preferably notifies the manufacturer 28 and manufacturer's representative 26 of the commission, and tracks the settlement of the commission between these two parties.

In an alternative embodiment, the manufacturer 28 determines the commission and pays the commission to the appropriate manufacturer's representative 26 once the manufacturer receives the purchase order payment from the distributor 24. Alternately, the distributor 24 may identify the manufacturer's representative to receive the commission.

Further, upon determining that the customer and payment information is rejected (Block 188), the host system 14 then may give the customer 18, if the customer is a commercial customer who entered a customer account number (Block 192), the option of resubmitting the order using different payment information (Block 194). For example, a contractor who exceeds their credit limit on their distributor customer account may still be able to order the product at the contractor price by using a credit card account for payment. If the host system 14 receives a signal from the commercial customer 18 indicting the desire to use different payment information, then the customer is returned to Block 178 to enter the payment information and continue. If the customer 18 is not a commercial customer, or if the host system 14 receives a signal from the commercial customer 18 indicting the desire not to use different payment information, then the transaction is ended (Block 196).

To conclude the process, the manufacturer 28 ships the products specified in the order directly to the customer 18 and bills the distributor 24 (Block 198). Preferably, the manufacturer 28 first reviews and approves the product order prior to shipment of the product. For example, the manufacturer 28 may not approve of a product order that directs a product to be shipped to a country subject to a government imposed boycott. The direct shipment to the customer 18 eliminates the distributor 24 from having to carry inventory of the products ordered using the present system 10. The distributor 24 pays the manufacturer 28 and bills the customer 18 (Block 200). The customer 18 receives the products on the purchase order and the distributor's bill, and then pays the distributor 24 (Block 202).

Figure 7:
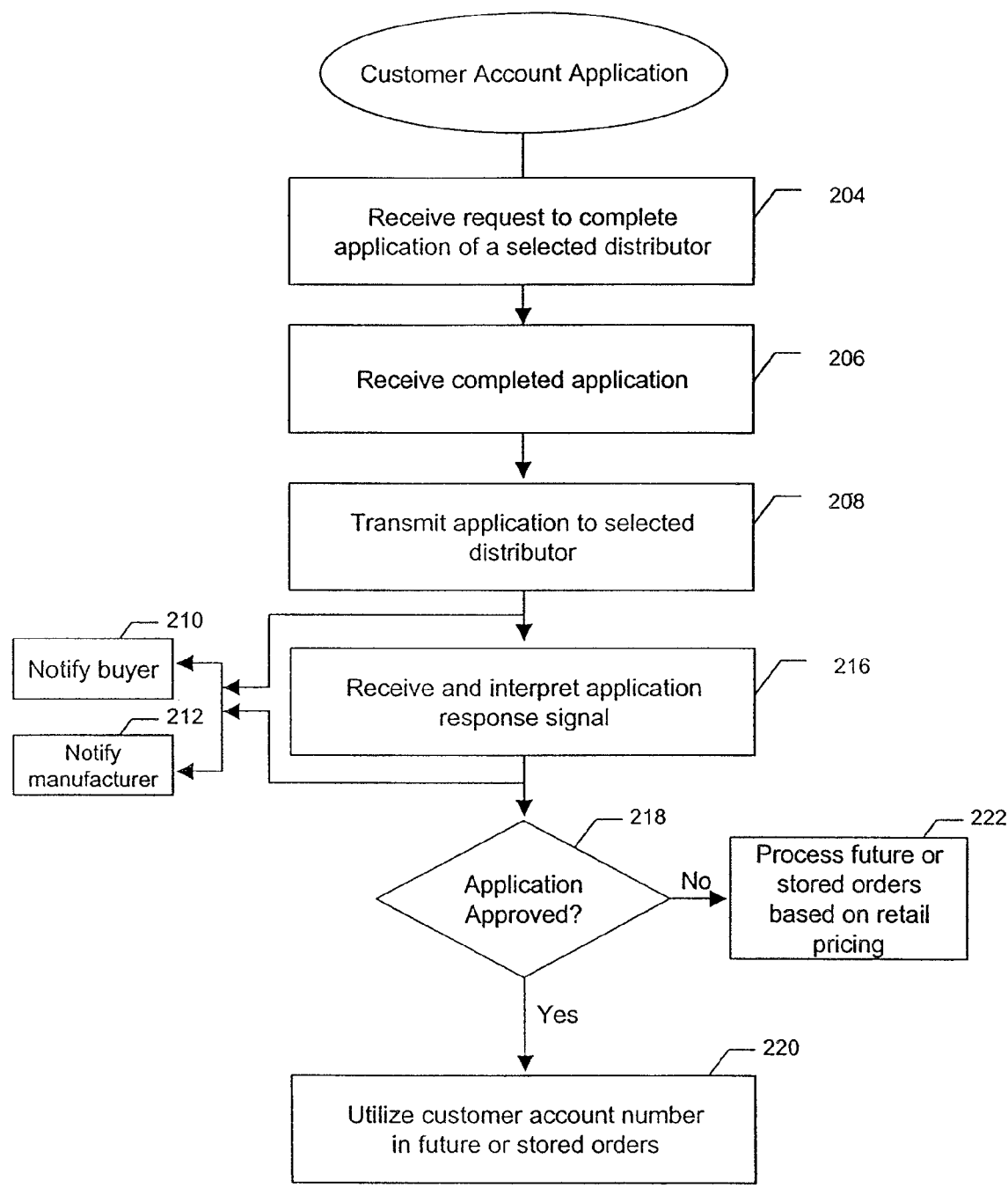
FIG. 7 is a flow chart detailing one embodiment of a customer account application process.

Referring to FIG. 7, the system and method of the present invention may include a credit application or customer account application process, integrated with the RFP and RFQ transactions, for a customer 18 who is a potential customer of a distributor. The host system 14 may provide, either during the ordering process, such as at the distributor selection or customer identification steps (FIG. 3, Blocks 130 and 132), or as a separate menu option, web pages 16 for the customer 18 to select a particular distributor's credit application and enter the required information (Block 204). The required information may vary by distributor, but typically includes information such as customer identification and financial/credit information. Once the required information is entered and the customer submits the application, the host system 14 receives the application, which may be confidentially stored in the customer database 55, and transmits the application to the selected distributor 24 (Blocks 206 and 208). Preferably, the credit application information is securely kept such that only the distributor 24 may access the information. Once the host system 14 transmits the application to the distributor 24, it also sends an acknowledgment to the customer 18 (Block 210). Further, the host system 14 sends a notification to the manufacturer 28 that the customer 18 has submitted an application to the selected distributor 24 (Block 212). The acknowledgment sent to the customer 18 (Block 210) may include information on approval time response based on the particular policies of the selected distributor 24. If the response time is not immediate, then the host system 14 may store the order in the order database 62 associated with the customer 18, so that the order may be re-submitted at a later date as a request for price or request for quotation, as indicated by the customer, upon receipt of the customer account number from the selected distributor.

The distributor 24 analyzes the application and returns an application response signal to the host system 14. The host system 14 receives, stores and interprets the application response signal as an approval or denial (Block 216) and notifies the customer 18 and manufacturer 28 of the application response (Blocks 210 and 212). If the application is approved (Block 218), then the approval includes a customer account number that the customer 18 may utilize in future requests, or the host system 14 may retrieve the stored request, automatically insert the customer account number, and continue processing (Block 220). If the application is denied (Block 218), then the customer 18 may enter other account data, such as a financial account, to get product prices or quotes based on retail pricing, or the host system 14 may retrieve the stored request and continue processing as a retail request (Block 222).

The processes and methods described above are presented in a preferred arrangement. The various steps may be combined, some steps may be eliminated, and/or the order of the steps may be changed and still be within the system and method of the present invention.

Figure 8:
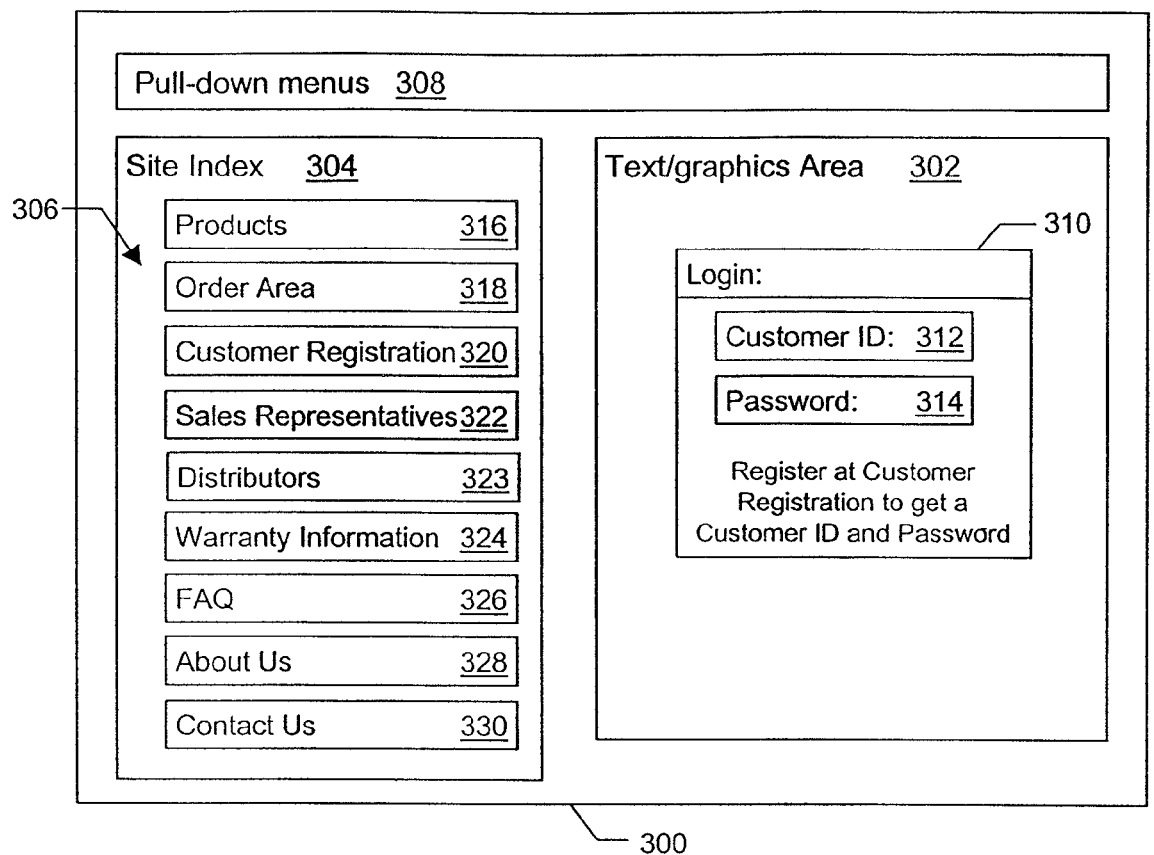
FIG. 8 is a schematic representation of one embodiment of a home page of a website for receiving a quotation and placing a product order.
Figure 9:
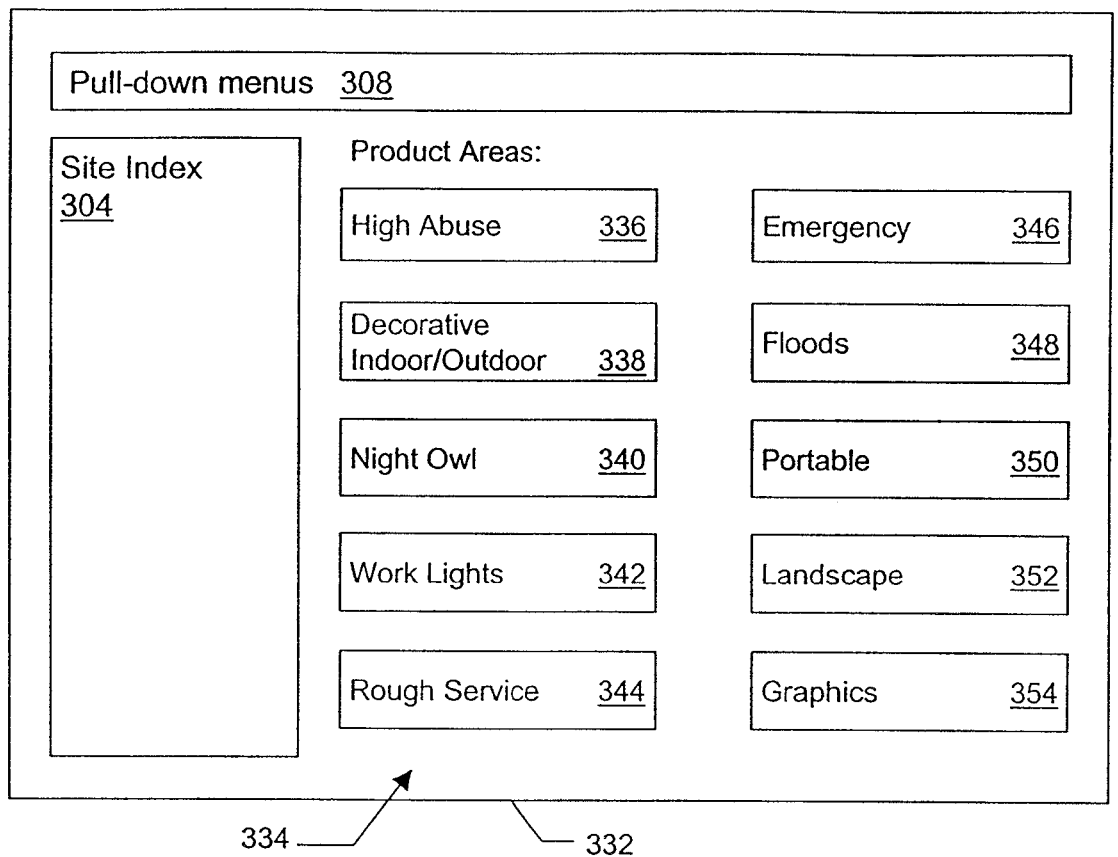
FIG. 9 is a schematic representation of one embodiment of a product area web page with various types of products available from a manufacturer.

Referring to FIG. 8, an exemplary manufacturer-specific website 15 includes a home page 300 having a text/graphics area 302 for displaying written and graphical/pictorial information welcoming the customer to the site and discussing the manufacturer and the manufacturer's products. The home page 300 also includes a site index 304 having a plurality of navigation buttons 306. Further, the home page 300 includes a plurality of pull-down menus 308 that drill-down to the various pages available within the website.

The home page 300 may initially present the customer with a login pop-up menu 310, requesting a customer identification 312 and a password 314. The customer identification 312 may be a unique alpha and/or numeric code or biometric data associated with the customer, while the password is a unique alpha and/or numeric code that verifies the identity of the customer. Both the customer identification 312 and password 314 may be compared with an authentic customer identification and password previously-stored in the customer database 55. The customer identification 312 may be the same as, or may be a part of, the customer identification 64 used in the request process as described regarding Block 104 (FIG. 2) and Block 132 (FIG. 3). By requesting a customer identification 312 and password 314, the host system 14 performs an information gathering function that enables recognition of the customer as, for example, a contractor, distributor, manufacturer's representative or retail customer, and to otherwise customize the presentation of the forthcoming web pages. Alternately, as described above, a login may not be required.

The plurality of navigation buttons 306 include direct links to areas of interest to the typical customer. For example, typical navigation buttons include: a product button 316 for further information on product areas and/or specific products; a order area 318 for linking to order entry web pages; a customer registration button 320 for entering customer information for storage in the customer database 55; a sales representative button 322 for information on the plurality of manufacturer's representatives 26; a distributor button 323 for information on the plurality of distributors 24; a warranty information button 324 for information on product warranties; a frequently asked questions (FAQ) button 326 for information in response to typical customer questions; an about us button 328 for information on the manufacturer 28; and a contact us button 330 for information on contacting the manufacturer 28 and or administrator of the host system 14.

In reviewing product information the customer 18 may select the products button 316, and be presented with a product areas page 332 displaying the various type of products 334 available from the manufacturer 28. For example, typical product areas offered by manufacturer W. F. Harris Lighting may include: High Abuse 336; Decorative Indoor/Outdoor 338; Night Owl 340; Work Lights 342; Rough Service 344; Emergency 346; Floods 348; Portable 350; Landscape 352; and Graphics 354, among others.

Figure 10:
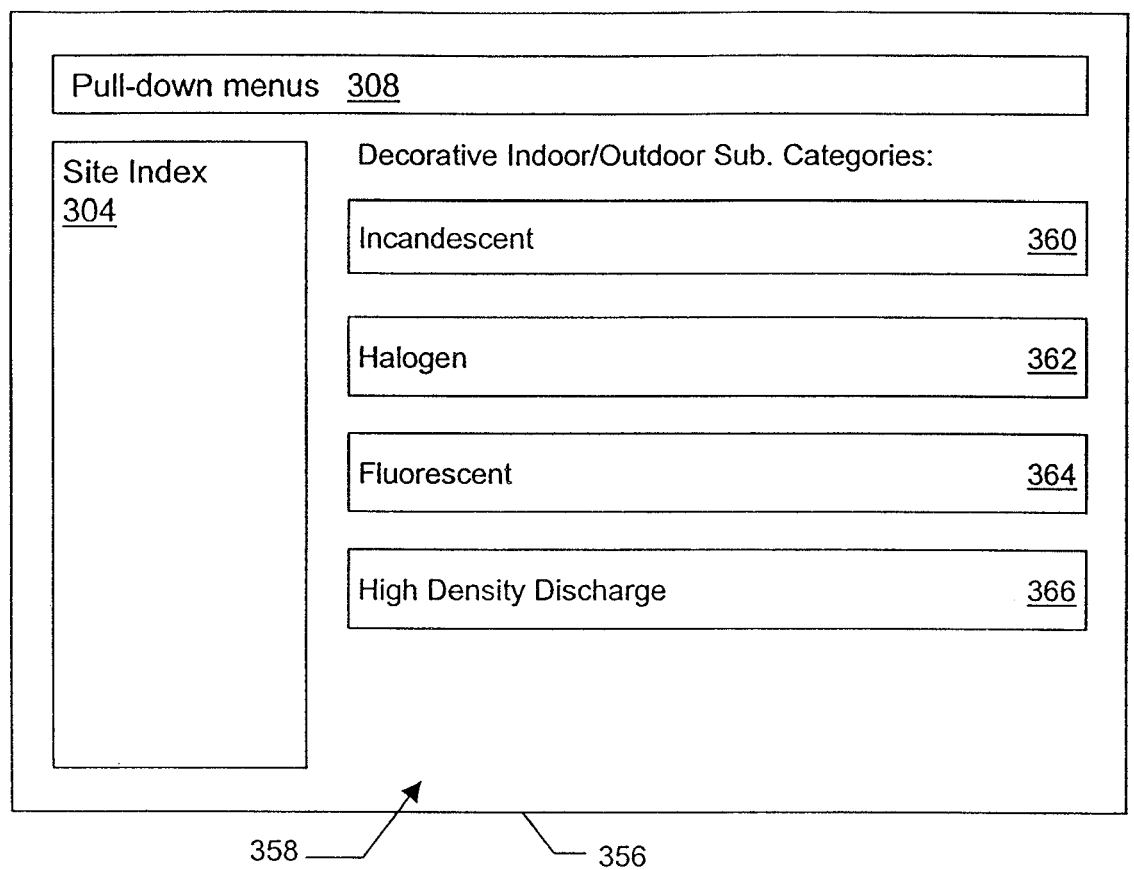
FIG. 10 is a schematic representation of one embodiment of a product area sub-category page with various sub-categories for a select type of product.

Referring to FIG. 10, upon selecting one of the various types of products 334, the customer 18 is presented with a product area sub-category page 356 including product sub-categories 358, which are specific for each of the types of products 334. For example, the sub-categories 358 for the decorative indoor/outdoor product area 338 may include: incandescent 360; halogen 362; fluorescent 364; and high density discharge 366, among others.

Figure 11:
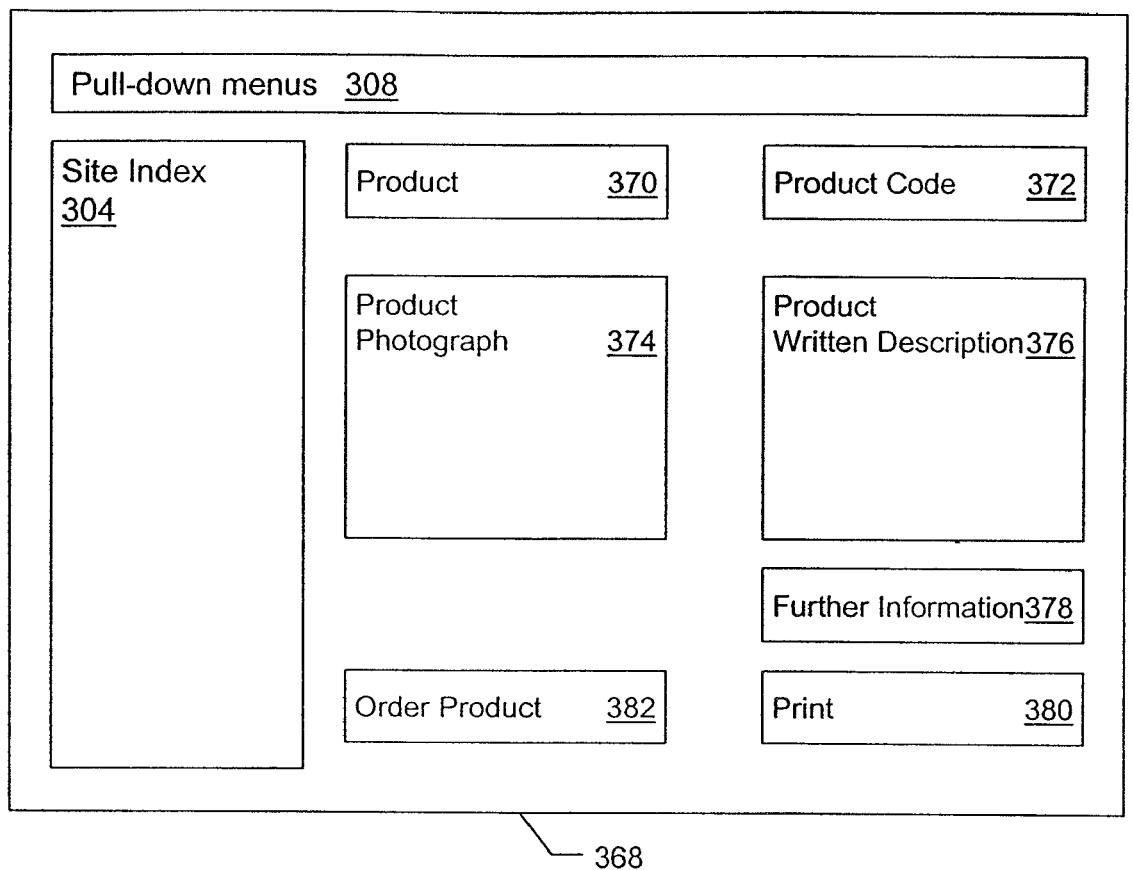
FIG. 11 is a schematic representation of one embodiment of a product page displaying various information relative to a selected product.

Referring to FIG. 11, upon selecting one of the product sub-categories 358, the customer 18 is presented with a product page 368 that includes information on one or a plurality of products categorized under the selected sub-category. For example, the product page 368 may include a product name 370 and an associated product code 372 assigned to the product by the manufacturer 28. Further, the product page 368 may include: a product photograph 374 or other image/representation of the product; a product written description 376 describing the product; a further information button 378 to obtain further detailed images or written description or specifications on the product; a print button 380 to print the product page 368; and an order button 382 to initiate the order process.

The web pages described above are for a preferred embodiment. Other embodiments including modifications, additions and/or deletions to the above-defined pages may be implemented and still be within the system and method of the present invention.

Thus, the system and method disclosed herein preferably includes a web-based system and method for a manufacturer to market and sell for profit or exposure its manufactured and/or assembled products on its exclusive website. The products are sold in cooperation with distributors using mutually agreed-upon or otherwise derived individual or overall predefined mark-ups. The customer prices may be accessed by a customer, where the distributor is customer-selected or automatically determined from customer information. Further, upon receiving an order having distributor-approved financing, an agent or manufacturer's representative associated with the order is credited with a commission based on the order and/or the customer and/or the account type. Typically, the commission is determined based on a commission rate, according to a standing agreement in effect between the manufacturer and agent/representative at the time the commission is calculated. Therefore, the system and method allows a customer to place an order through a manufacturer's website, using a customer- or automatically-selected distributor and crediting a manufacturer's representative, thereby providing incremental sales and marketing that benefit the manufacturer, distributor and manufacturer's representative.

Although the invention has been described and illustrated in detail, it is to be clearly understood that the same is intended by way of illustration and example only and is not to be taken by way of limitation. Accordingly, variations and modifications of the present invention will be apparent to one skilled in the art, and the following claims are intended to cover all such modifications and equivalents.

What is claimed is:

1. A system for generating an order for a product, comprising:
a receiver component that receives, on behalf of a manufacturer, requests to order a product from a customer and for receiving financial authorization from a distributor, a request including a product code that identifies the product and a customer identification that identifies a customer, and a financial authorization comprising an acknowledgment from the distributor verifying a customer account even though the request is received by the receiver component in a manner independent of the distributor;
an order placement component that retrieves information for the identified product including a customer price and that uses the retrieved information to place an order from the manufacturer of the identified product; and
an order fulfillment component that completes a purchase of the product in accordance with the order placed by the order placement component including arrangement for shipping by the manufacturer and billing of the distributor.

2. The system of claim 1, wherein the customer identification includes an indication of the distributor so as to identify the predetermined pricing function.

3. The system of claim 1, wherein the customer identification includes a customer account number associated with the distributor.

4. The system of claim 3, wherein the receiver component is further for receiving an account number acknowledgment from the distributor associated with the customer account number so as to identify the predetermined pricing function.

5. The system of claim 1, further comprising a data storage medium for storing pricing information associated with a plurality of distributors, and wherein the predetermined pricing function includes the distributor pricing information of the identified distributor in the customer price.

6. The system of claim 1, further comprising a commission component that determines a commission and assigns the commission to a manufacturer's representative, where the commission is based on the order, and where the manufacturer's representative is associated with the customer identification.

7. The system of claim 1, further comprising a commission component that determines a commission and assigns the commission to a manufacturer's representative, where the commission is based on the order, and where the manufacturer's representative is associated with the product.

8. The system of claim 1, further comprising a commission component that determines a commission and assigns the commission to a manufacturer's representative, where the commission is based on the order, and where the manufacturer's representative is associated with the customer identification and the product.

9. The system of claim 1, further comprising a data storage medium for storing information associating a manufacturer's representative with a plurality of predetermined variables; and further comprising a commission component that determines a commission and assigns the commission to a manufacturer's representative based on at least one of the plurality of predetermined variables, where the commission is based on the customer price.

10. The system of claim 9, wherein the plurality of predetermined variables includes at least one of a territory, a distributor, a manufacturer, a commission percentage and the customer identification.

11. The system of claim 1, wherein the receiver component is in communication via a public access communications network with a site displaying information for the product, and wherein the order is received via the public access network.

12. The system of claim 1, wherein the receiver component is in communication via a public access communications network with a manufacturer-specific site displaying information for the product, where the manufacturer-specific site primarily displays only products of a single manufacturer, and wherein the order is received via the public access network.

13. A method for generating an order for a product, comprising:

receiving, by a server system on behalf of a manufacturer, requests to order a product from a customer and financial authorization from a distributor, a request including a product code that identifies the product and a customer identification that identifies a customer, and the financial authorization comprising an acknowledgment from the distributor verifying a customer account even though the request is received in a manner independent of the distributor;

retrieving information with the server system for the identified product including a customer price and using the retrieved information to place an order from the manufacturer of the identified product; and completing a purchase of the product in accordance with the order that has been placed by the server system including arrangement for shipping by the manufacturer and billing of the distributor.

14. The method of claim 13, wherein the customer identification includes an indication of the distributor so as to identify the predetermined pricing function.

15. The method of claim 13, wherein the customer identification includes a customer account number associated with the distributor.

16. The method of claim 15, further comprising receiving an account number acknowledgment with the server system from the distributor associated with the customer account number so as to identify the predetermined pricing function.

17. The method of claim 13, further comprising storing pricing information associated with a plurality of distributors in a data storage medium, and wherein the predetermined pricing function includes the distributor pricing information of the identified distributor in the customer price.

18. The method of claim 13, further comprising determining a commission with the server system and assigning the commission to a manufacturer's representative, where the commission is based on the order, and where the manufacturer's representative is associated with the customer identification.

19. The method of claim 13, further comprising determining a commission with the server system and assigning the commission to a manufacturer's representative, where the commission is based on the order, and where the manufacturer's representative is associated with the product.

20. The method of claim 13, further comprising determining a commission with the server system and assigning the commission to a manufacturer's representative, where the commission is based on the order, and where the manufacturer's representative is associated with the customer identification and the product.

21. The method of claim 13, further comprising storing information in a data storage medium associating a manufacturer's representative with a plurality of predetermined variables; and determining a commission and assigning the commission to a manufacturer's representative based on at least one of the plurality of predetermined variables, where the commission is based on the customer price.

22. The method of claim 21, wherein the plurality of predetermined variables includes at least one of a territory, a distributor, a manufacturer, a commission percentage and the customer identification.

* * * * *